May 10, 1960 J. L. D. MORRISON ET AL 2,935,879

DRIVING MECHANISM FOR MAGNETIC RECORDER AND PLAYER

Filed Aug. 16, 1954

INVENTORS.
JAMES L. D. MORRISON
WILLARD J. FAULKNER
BY
George A. Gust
ATTORNEY

United States Patent Office 2,935,879

Patented May 10, 1960

2,935,879

DRIVING MECHANISM FOR MAGNETIC RECORDER AND PLAYER

James L. D. Morrison, Benton Harbor, and Willard J. Faulkner, Coloma, Mich., assignors to V-M Corporation, Benton Harbor, Mich., a corporation of Michigan Application August 16, 1954, Serial No. 449,936

5 Claims. (Cl. 74—209)

The present invention relates to a driving mechanism for a magnetic recorder and player, and more particularly to a driving mechanism for controlling the starting and stopping of associated apparatus. While this invention is particularly described as being embodied in a machine of the type which utilizes conventional magnetic tape, it will appear from the description that the invention is equally adaptable for use on magnetic wire machines.

Driving mechanisms in conventional tape recorders normally utilize an idler wheel composed of a rubber-like material which is interposed between and drivably engaged with a motor spindle and a capstan inertia wheel. The idler is normally larger in diameter than the motor spindle but smaller than the capstan wheel. The idler wheel is normally forcefully maintained in engagement with the spindle and capstan wheel, such that during the time the machine is stopped the engagement between the idler and the motor spindle causes a slight indentation in the idler periphery, whereas the capstan wheel tends to flatten the idler periphery. If permitted to stand in this stationary condition, the idler will take permanent sets in its periphery, thereby making the circumference non-uniform. During operation of the mechanism, rotary motion imparted to the inertia wheel will be jerky or uneven, whereupon the recording or playing of a tape will be correspondingly jerky or uneven, thereby rendering poor fidelity.

In order to prevent the aforementioned type of damage to the idler wheel, it is desirable that the wheel be physically spaced from both the spindle and the inertia wheel during periods of machine non-operation. In view of this, it is an object of this invention to provide a driving mechanism which will prevent damage to the idler wheel.

It is another object of this invention to provide a driving mechanism for a magnetic recorder and player wherein the idler wheel is operable to be physically spaced from the motor spindle and capstan inertia wheel during periods when the machine is stopped.

It is yet another object of this invention to provide a driving mechanism having a unique idler wheel carrier which may be manipulated to move the idler into and out of driving engagement with the motor and capstan inertia wheel.

Other objects will become apparent as the description proceeds.

To the accomplishment of the above and related objects, the invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
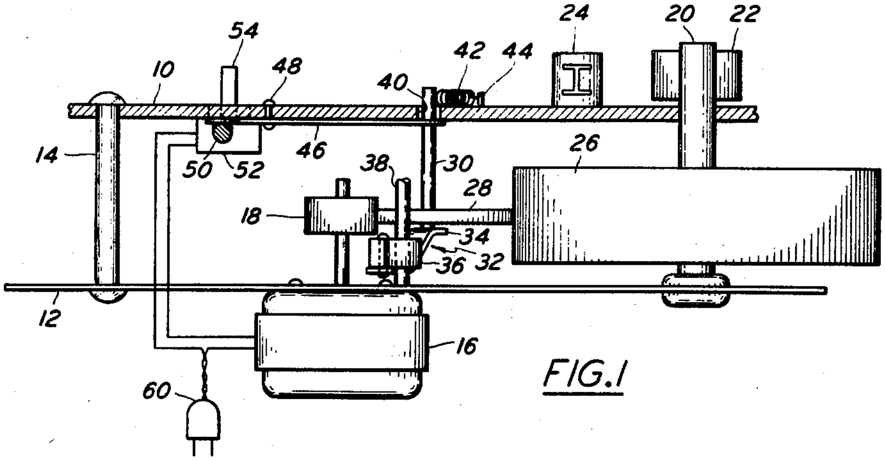
Fig. 1 is a sectional illustration of one embodiment of this invention.
Figure 2:
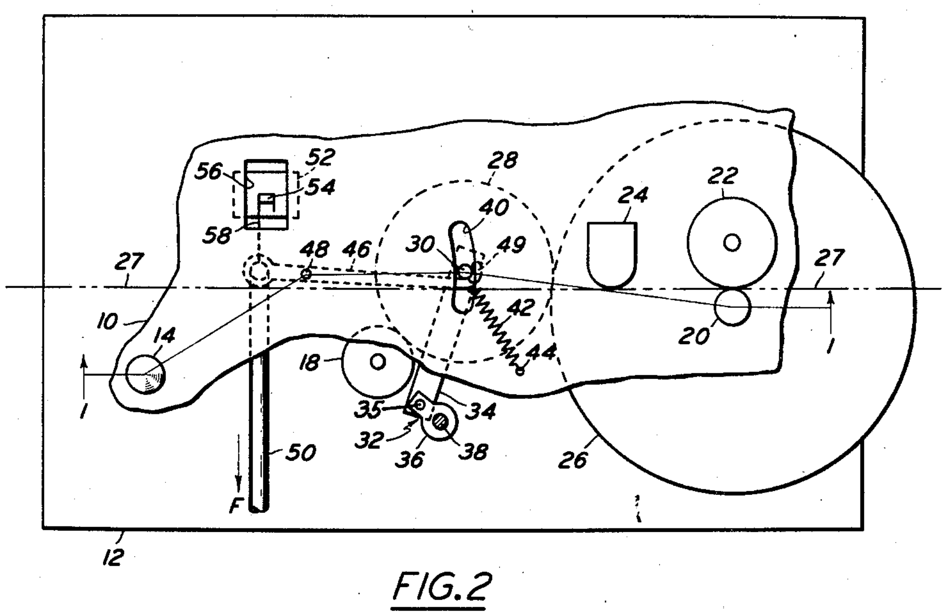
Fig. 2 is a fragmental plan view thereof.

Referring to the drawings, the supporting chassis is comprised of a flat sheet metal plate 10 and another similar plate 12 joined to the plate 10 by means of suitable rivets or supporting posts 14. A motor 16 of conventional design is secured to the bottom plate 12 and carries a spindle or drive wheel 18 in the space between the two plates 10 and 12. A rotary shaft 20, commonly referred to as a "capstan" by those skilled in this art, is rotatably mounted in the two plates 10 and 12 in an upright position, and a rubber or the like pressure roller 22 which is freely rotatable is engaged therewith (Fig. 2). A magnetic recording or playing head 24 is mounted on the top side of the chassis 10 adjacent the pressure roller-capstan assembly 20, 22 for receiving a magnetic tape 27 which is drawn through the mechanism at a fixed velocity by means of the capstan 20.

The capstan 20 performs its usual function of feeding the tape through the mechanism at a uniform velocity which conduces to high fidelity reproduction.

A capstan inertia wheel 26 made suitably large and of relatively heavy material is coaxially affixed to the lower end of the capstan 20 and disposed between the two plates 10 and 12. By rotation of this inertia wheel 26, the capstan 20 is rotated.

An idler wheel 28 is operatively interposed between the motor spindle 18 and the capstan wheel 26 for imparting rotation from the motor 16 to the capstan 20. This idler 28 is rotatably mounted on an upright pin 30, and is preferably made of a pliant, rubber-like material having a relatively high coefficient of friction. Preferably, the spindle 18 is made of metal as is the capstan wheel 26. The lower end of the pin 30 is pivotally secured to a toggle mechanism, indicated generally by the reference numeral 32. A toggle arm 34 is directly affixed to the pin 30 at one end and is pivotally secured at its other end to a second toggle arm 36 by means of pivot pin 35. The opposite end of this arm 36 is swingably mounted on an upright pivot bar 38 secured between the two chassis plates 10 and 12.

The upper end of the idler pin 30 projects beyond the upper surface of the chassis plate 10 through an arcuate slot 40 which serves to guide the pin 30 for horizontal movement. A tension or return spring 42 is connected between the upper end of the pin 30 and a suitable post 44 on the plate 10 for yieldably urging the wheel 28 into engagement with the spindle 18 and the inertia wheel 26. As seen in Fig. 2, horizontal movement of the pin 30 serves to move the idler 28 toward and away from engagement with the spindle 18 and the inertia wheel 26. The spring 42, however, normally retains the wheel 28 in engagement therewith. Also as noted in Fig. 2, the toggle or carrier 32 is normally maintained at an angle such that movement of the wheel 28 to a position of disengagement is accommodated by mere straightening of the toggle.

Actuating mechanism for disengaging the idler 28 includes a lever 46 pivoted intermediate its ends on the main chassis 10 by means of a rivet 48. The right-hand end of the lever 46 is provided with a hook 49 which engages the upper end of the pin 30, and at the other end is connected to a reciprocable operating rod 50. By moving the rod 50 in the direction of the arrow F, the lever 46 is pivoted counter-clockwise for moving the idler 28 to its disengaged position. A suitable electrical switch 52 having an upright operating arm 54 is mounted on the under side of the chassis plate 10 in registry with a suitable opening 56 which receives the arm 54. A wire 58 with a hooked end is secured to the left end of the lever 46 for operating the switch 52 when the operating rod 50 is moved as described in the preceding; thus, by suitable electrical connections between this switch 52 and the motor 16, as indicated by the reference numeral 60, energizing power for the motor 16 may be controlled. The switch 52 is so arranged that when the rod 50 is moved in a direction to disengage the idler 28 from the spindle 18 and the inertia wheel 26, the switch 52 is caused to interrupt power for the motor 16.

In operation, with all of the parts in the illustrated positions, energization of the motor 16 will cause rotation of the spindle 18 which is transmitted by means of the idler 28 to the inertia wheel 26. If the perimeters of all three wheels are perfect circles, the capstan 20 will be uniformly rotated, whereupon the tape 27 will pass the recording head 24 with constant velocity. This conduces to achieving maximum or the highest degree of fidelity in reproduction.

In order to stop the machine, the operating rod 50 is moved in the direction of the arrow F, which results in withdrawing the idler 28 from engagement with the two wheels 18 and 26. The switch 52 is operated simultaneously to deenergize the motor 16. The idler 28 is thus physically removed and spaced from the two wheels 18 and 26, thereby leaving its peripheral surface free from any indenting or distorting forces which would alter its circumferential form of a perfect circle.

In prior machines, the idler 28 was continuously maintained in contact with the two wheels 18 and 26 or with either one alone. Since such contact normally indented the perimeter of the idler 28, such indentation if permitted to continue over an extended period of time would produce a permanent set in the idler wheel material, such that subsequent operation would produce a bump or jerk with each rotation of the idler. This uneven rotation would obviously be transmitted to the captan 20 which would cause corresponding jerky motion of the tape 27.

In many instances, the idler 28 is permitted to engage the motor spindle 18 at all times. This is particularly disadvantageous, because the heat developed in the motor 16 is conducted to the spindle 18 which tends to produce quickly a deformation in the idler periphery. In some instances, the heat has been so intense as to cause either fusion or melting of the material of the idler 28.

By providing an arrangement which is operable to withdraw the idler 28 from both the motor spindle 18 and inertia wheel 26 substantially simultaneously and to hold the idler in this position during periods of machine non-operation, the indenting problems of the foregoing are completely avoided. While conducing to the reproduction of high fidelity audio signals, this arrangement also improves the wear-life and reliability of the machine.

What is claimed is:

1. A driving mechanism for a magnetic recorder and player comprising a supporting chassis, a motor having a driving spindle mounted on said chassis, a capstan rotatably mounted on said chassis and carrying an inertia wheel, an idler wheel interposed between both said spindle and said inertia wheel for imparting rotary motion to the latter, an idler carriage assembly supported by said chassis and carrying said idler wheel, said carriage assembly comprising a linkage having two pivotally connected rigid arms, means pivotally supporting one arm on a fixed point on said chassis, the other arm pivotally supporting said idler wheel at its free end, spring means biasing the idler wheel into engagement with the spindle and inertia wheel, operating means associated with one of said arms for extending said arms substantially into alinement to displace said idler wheel out of engagement with both said spindle and said inertia wheel, and cooperating means on said chassis and the free end of said other arm for guiding the said other arm in its movement.

2. A driving mechanism for a magnetic recorder and player comprising a supporting chassis, a motor having a driving spindle mounted on said chassis, a capstan rotatably mounted on said chassis and carrying an inertia wheel, an idler wheel interposed between both said spindle and said inertia wheel for imparting rotary motion to the latter, an idler carriage assembly supported by said chassis and carrying said idler wheel, said carriage assembly comprising a linkage having two pivotally connected rigid arms, means pivotally supporting one arm at a fixed point on said chassis, the other arm rotatably supporting said idler wheel at its free end, spring means biasing the idler wheel into engagement with the spindle and inertia wheel, and cooperating means on said chassis and said other arm for moving and guiding said idler wheel into and out of contacting engagement with both said spindle and said inertia wheel.

3. A driving mechanism for a magnetic recorder and player comprising a supporting chassis, a motor having a driving spindle mounted on said chassis, said spindle being composed of rigid material, a capstan rotatably mounted on said chassis and carrying an inertia wheel, said inertia wheel being composed of rigid material, an idler wheel interposed between both said spindle and said inertia wheel for imparting rotary motion to the latter, said idler wheel being composed of semi-rigid rubber-like material, an idler carriage assembly supported by said chassis and carrying said idler wheel, said carriage assembly comprising a linkage having two pivotally connected rigid arms, means pivotally supporting one arm at a fixed point on said chassis, the other arm rotatably supporting said idler wheel at its free end, cooperating means on said chassis and the free end of said other arm for guiding said idler wheel into and out of contacting engagement with both said spindle and said inertia wheel, and means to extend said arms into substantial alinement to move said idler wheel away from said spindle and said inertia wheel.

4. A driving mechanism for a magnetic recorder and player comprising a chassis having two spaced parallel supporting plates, a motor having a driving spindle mounted on one plate with the spindle interposed between both plates, a capstan rotatably mounted in the other of said plates and carrying an inertia wheel interposed between both plates, an idler wheel supported between both plates and interposed between both said spindle and said inertia wheel for imparting rotary motion to the latter, an idler carriage assembly supported by said one plate and carrying said idler wheel, said carriage assembly comprising a linkage having two pivotally connected arms, one arm being fixedly pivoted on said one plate, the other arm floating without support and rotatably supporting said idler wheel, a shaft for said idler wheel projecting through an arcuate slot in the other of said plates, said slot guiding said shaft and idler wheel into and out of contacting engagement with both said spindle and said inertia wheel, and an idler wheel-positioning device operatively supported by said chassis and being connected to said shaft for moving the latter in said arcuate slot whereby said idler wheel may be moved selectively into or out of contact with said spindle and said inertia wheel.

5. A driving mechanism for a magnetic recorder and player comprising a chassis having two spaced parallel supporting plates, a motor having a driving spindle mounted on one plate with the spindle interposed between both plates, a capstan rotatably mounted in the other of said plates and carrying an inertia wheel interposed between both plates, an idler wheel supported between both plates and interposed between both said spindle and said inertia wheel for imparting rotary motion to the latter, an idler carriage assembly supported by said one plate and carrying idler wheel, said carriage assembly comprising a linkage having two pivotally connected arms, one arm being fixedly pivoted on said one plate, the other arm floating without support and rotatably supporting said idler wheel, a shaft for said idler wheel projecting through an arcuate slot in the other of said plates, said slot guiding said shaft and idler wheel into and out of contacting engagement with both said spindle and said inertia wheel, and a lever pivotally mounted on said other plate and having one arm connected to said shaft, said lever serving to move said idler wheel out of engagement with said spindle and said inertia wheel.

References Cited in the file of this patent

UNITED STATES PATENTS 868,435 Heald ---------------- Oct. 15, 1907

2,221,661 Woolf ---------------- Nov. 12, 1940
2,248,384 Redin ---------------- July 8, 1941
2,418,541 Camras ---------------- Apr. 8, 1947
2,490,667 Boyd ---------------- Dec. 6, 1949
2,529,376 Dale ---------------- Nov. 7, 1950
2,711,104 Shields ---------------- June 21, 1955